Dec. 19, 1972   A. MARTINSONS   3,706,644
METHOD OF REGENERATING SPINEL SURFACED ELECTRODES
Filed March 8, 1971   2 Sheets-Sheet 1

FIG. 1

INVENTOR
ALEKSANDRS MARTINSONS

BY Chisholm and Spencer
ATTORNEYS

FIG. 2

United States Patent Office 3,706,644
Patented Dec. 19, 1972

3,706,644
METHOD OF REGENERATING SPINEL SURFACED ELECTRODES
Aleksandrs Martinsons, Wadsworth, Ohio, assignor to PPG Industries, Inc., Pittsburgh, Pa.
Continuation-in-part of abandoned application Ser. No. 60,060, July 31, 1970. This application Mar. 8, 1971, Ser. No. 121,692
Int. Cl. B01r 3/04; C01d 1/06
U.S. Cl. 204—98
32 Claims

ABSTRACT OF THE DISCLOSURE

A method is disclosed for treating electrodes, particularly after extended periods of use. This method is particularly useful for electrodes having spinel surfaces on electroconductive valve metal substrates, but may also be used for any electrode having an oxide surface on a valve metal substrate.

CROSS REFERENCE TO RELATED APPLICATION

This application is a continuation-in-part of co-pending application Ser. No. 60,060, now abandoned, filed July 31, 1970, by Aleksandrs Martinsons for "Method of Treating Electrodes."

BACKGROUND

Chlorine and alkali metal hydroxides, such as lithium hydroxide, sodium hydroxide, and potassium hydroxide, are produced commercially by either of two electrolytic processess—electrolysis in a diaphragm cell or electrolysis in a mercury cell. Alkali metal chlorates are made in a cell similar in structure to a diaphragm cell but not having a diaphragm.

The design and operation of mercury cells, diaphragm cells, and chlorate cells, are more fully treated in Mantell, Electrochemical Engineering, McGraw-Hill, New York, N.Y. (1960), and Sconce, Chlorine, Reinhold, New York, N.Y. (1962).

Common to all three proceses has been the use of carbon anodes. These carbon anodes are a constant source of difficulty. They are short lived and subject to uneven wear and erosion. In mercury cells, frequent adjustment is required in order to maintain a constant gap between the cathode and anode and thereby maintain a constant voltage drop across the electrolyte. In diaphragm cells and chlorate cells, no provision is made for varying the anode-cathode space, and, accordingly, the voltage increases with time. Additionally, organic solvents present in the graphite electrodes may plug the diaphragm, resulting in a further increase in voltage. Reaction of the anode products with the graphite anode result in halogenated hydrocarbons being present in the anode product.

Many attempts have been made to remedy these problems. It has long been recognized that a superior anode would be one made of a solid precious metal. However, this is neither economical nor practical. The art shows many attempts to obtain a lower cost electrode having the long life and low overvoltage of a solid precious metal electrode, as well as the low cost of a graphite electrode. These attempts have sought to provide a durable coating, usually of a platinum group metal or platinum group metal oxide, on an electrocoductive base, which base usually is composed of a valve metal such as titanium.

These electrodes are noticeably longer in life and operate at lower voltages than carbon electrodes. However, platinum group metals either as such or as their oxides are expensive.

Commonly assigned, co-pending United States application Ser. No. 106,840, filed Jan. 15, 1971, by Paul P. Anthony, for "Electrodes," the disclosure of which is incorporated herein by reference, a continuation-in-part of commonly assigned, co-pending United States application Ser. No. 43,377, filed June 4, 1970, by Paul P. Anthony for "Electrode Coatings" discloses an electrode having a bimetal spinel surface on an electroconductive substrate, which substrate may be protected from oxidation by a thin coating of a platinum group metal, or an oxide of a platinum group metal or by any material which is more electroconductive than the spinel and/or more resistant to oxidation than the base. Such electrodes are suitable for use as anodes in the electrolysis of brines. They may also be used as anodes in the electrodeposition of metals (such as nickel, copper, cobalt, zinc, and tin) from aqueous solutions of metal salts. Such electrodes may also be used in the cathodic protection of marine equipment. They may also be used for the conduct of organic electrolytic oxidation.

After long periods of electrolysis at high current densities, for example, after about twelve to eighteen months at current densities above about 125 amperes per square foot, with electrodes having a spinel surface on an electroconductive substrate, a sudden increase in voltage across the cell occurs. This is, typically, an increase of about one volt or more in a period of about two to ten hours. There is always some voltage increase with time. In a diaphragm cell the portion of the voltage increase that is linear with time can be correlated with plugging and deterioration of the diaphagm. The sudden portion of the voltage increase is associated with the loss of electrolytic activity of the electrode.

SUMMARY OF THE INVENTION

It has now been found that according to this invention the electrolytic activity of such electrodes having spinel surfaces on electroconductive metallic substrates, as disclosed, for example, in the aforesaid United States application, may be regenerated by heating the electrodes under an atmosphere substantially free of oxygen and other reactive gases. Such treated electrodes may then be reused as anodes.

As used herein, "spinel" means a metal oxycompound having the unique crystal structure and formula characteristic of spinels. The spinel may be applied with a suitable binding agent over a suitably-treated metal structural member or substrate, or the spinel may be applied to the substrate by other means. Such spinel itself consists essentially of a metal or metals and oxygen in chemical combination. However, amounts, usually minor amounts, of other materials such as other metal oxides, sulfides, fluorides, or even metals in the metallic state, may be entrapped in or associated with the spinel crystal structure without seriously impairing the desirable properties of the spinel surface.

A suitable electroconductive substrate is one that retains its electroconductive properties during the formation of the spinel surface thereon in the course of using the resulting electrode for its intended purpose. Such a substrate will be resistant to oxidation during fabrication and electrolysis, and will not be subject to attack by the gases liberated during electrolysis. Preferably, the substrate should be substantially more electroconductive than the spinel itself.

If the electroconductive substrate is of titanium or a like valve-forming metal, which metals readily oxidize to form a non-conductive oxide film, the preferred practice is to take precautions to avoid formation of such undesirable films. In one exemplification of this invention, the electroconductive member, i.e., titanium, is protectively covered with a thin, electroconductive coating such as a platinum group metal layer over which the spinel is placed.

DESCRIPTION OF INVENTION

According to this invention the portion of the voltage increase associated with the loss of electrolytic activity may be significantly reduced and the electrode regenerated by heating the electrode under a non-reactive atmosphere substantially free of oxygen and other reactive gases (i.e., having a partial pressure of oxygen and such other reactive gases of less than $2 \times 10^{-5}$ millimeters of mercury). As used herein, "other reactive gases" means those gases that could react with either the spinel coating, or the substrate, or both. Such gases include carbon monoxide, hydrogen, the halogens, and oxides of nitrogen, among others.

In one exemplification, this is accomplished by heating the anode under a vacuum of about $10^{-4}$ millimeters of mercury or less. In this way there is a substantial absence of oxygen and other reactive gases, the partial pressure of atmospheric oxygen being below about $2 \times 10^{-5}$ millimeters of mercury. Regeneration of the electrode is favored by low pressures. Satisfactory results are obtained at total pressures below about $10^{-4}$ millimeters of mercury.

In another exemplification this is accomplished by heating the anode in an atmosphere of argon or another inert gas that is substantially free of oxygen and other reactive gases. In this way the partial pressure of oxygen and such reactive gases is below about $10^{-4}$ millimeters of mercury. Suitable inert gases include the inert gases in the last column of the periodic chart, as helium, neon, argon, krypton, xenon, and radon. Additionally, those gases that do not react appreciably with either the spinel surface or the substrate may also be used, as nitrogen and carbon dioxide.

In this treatment, the anode is heated to a regenerating temperature, that is, a high enough temperature to regenerate the electrode. Typically, this is a temperature above about 700° C. but below the deterioration temperature of the anode, that is below temperatures which either deform the anode or cause the spinel to decompose or convert to a mixture of metallic oxides or both. As a rule this limits the maximum temperature to below about 1200° C. The particularly appropriate temperature or temperature range between about 700° C. and 1200° C. will vary for different spinel-substrate combinations and different substrate thicknesses. For example, with an electrode having a cobalt aluminate ($CoAl_2O_4$) surface on a platinum treated, one-sixteenth of an inch thick, titanium substrate, satisfactory results are obtained at temperatures from about 750° C. to about 1000° C., with best results being obtained at temperatures from about 800° C. to about 900° C. For an electrode having a nickel aluminate ($NiAl_2O_4$) surface on a platinum treated, one-sixteenth of an inch thick, titanium substrate, satisfactory results are obtained at temperatures from about 750° C. to about 1000° C., with best results being obtained at temperatures from about 800° C. to about 900° C.

The time required to regenerate anodes by heat treatment under reduced pressure of oxygen varies with the temperature of the treatment, the particular spinel being treated, the particular valve metal used in fabricating the substrate, and the thickness of the substrate. Typically, the time required for regeneration will be from about one-half hour to about two hours. For an electrode having a nickel aluminate ($NiAl_2O_4$) coating on a platinum treated titanium substrate 1/16 inch thick, substantial regeneration is obtained after about one hour of treatment at about 800° C. For an electrode having a cobalt aluminate coating ($CoAl_2O_4$) on a platinum treated titanium substrate 1/16 inch thick, substantial regeneration is obtained after about one hour treatment at 800° C.

In one exemplification of this invention, the anodes may be removed from the backplate for regeneration. The anodes, once removed, are inserted in a suitable furnace, as a vacuum resistance furnace, and regenerated therein.

Figure 1:
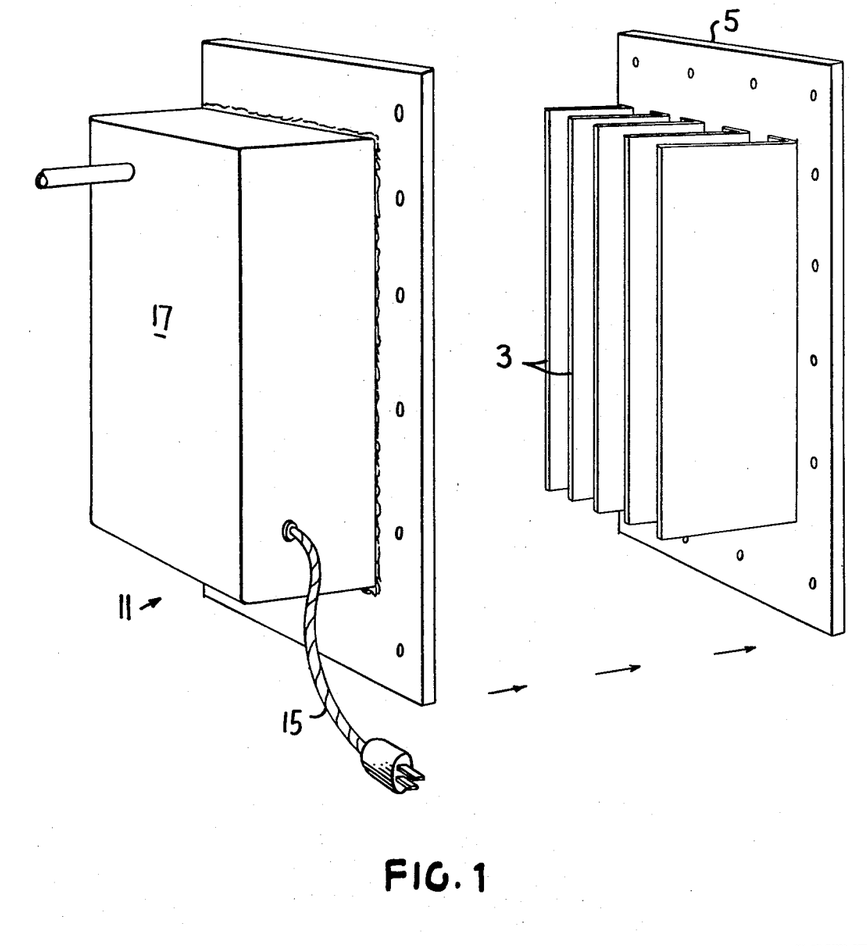
FIG. 1 is a perspective view of one apparatus suitable for carrying out the regeneration process.

In another exemplification of this invention shown in FIG. 1, the anodes 3 remain fixed to the backplate 5. A portable regenerating furnace 11 is affixed to the anodic side of the backplate 5. In the exemplification there shown, a regenerating atmosphere essentially free of oxygen and other reactive gases is provided through opening 13. This may be accomplished by supplying an inert gas (as described previously) to the heating chamber 17 of the furnace 11 through the opening. Alternatively, this may be accomplished by providing a vacuum through opening 13.

After the regenerating atmosphere is provided, as described above, the heating elements within the furnace are energized, as through power source 15.

This method of supplying the regenerating atmosphere and temperature may also be used with alkali metal chloride cells of the Hooker type. Such cells are characterized by having a horizontal base member with a plurality of anodes attached thereto. When regenerating the anodes of such cells, the cathode structure and the cell top may be removed and replaced with a regenerating furnace. The regeneration operation the proceeds as described above.

Additionally, the method of heating spinel coated anodes in the substantial absence of oxygen may also be used after the fabrication of the anodes and prior to their use.

While the method of this invention is particularly useful for electrodes having a spinel surface on a suitable electroconductive substrate, it may also be used with any electrode having a metal oxide coating on a valve metal substrate.

Spinels are oxycompounds of one or more metals characterized by a unique crystal structure, stoichiometric relationship, and X-ray diffraction pattern.

Oxycompounds having the spinel structure may be represented by the empirical formula where $M^{II}$ represents a metal having a valence of plus 2 and $M^{III}$ represents a metal having a valence of plus 3. $M^{II}$ and $M^{III}$ may be the same metal as in $Cr^{II}Cr^{III}_2O_4$, or $M^{II}$ and $M^{III}$ may be different metals as in $NiCr_2O_4$. Spinels are more precisely represented by the empirical formula where $M^{II}$ represents a metal having a valence of plus 2, and $M^{IIIa}$ and $M^{IIIb}$ represent metals having a valence of plus 3. $M^{IIIa}$ and $M^{IIIb}$ may either be the same metal or different metals, and one or both of them may represent the trivalent state of the metal present in the divalent state, as $Fe^{II}(Cu^{III}Fe^{III})O_4$, or all three metal ions may be ions of different metals as $MgAlFeO_4$.

The spinel crystal structure and the methods of identifying it by X-ray techniques are described in the literature. For example, the spinel structure is discussed in Wyckoff, Crystal Structure, vol. 3 (2nd edition), Wiley & Sons, New York (1963) at pages 75 to 86; in Wells, Structural Inorganic Chemistry, Oxford University Press, New York (1950) at pages 379 to 388; in Evans, An Introduction to Crystal Chemistry (2nd edition), Cambridge University Press, New York (1966) at pages 171 to 175; and in Bragg, Claringbull and Taylor, The Crystalline State, vol. 4: Crystal Structures of Minerals, G. Bell & Sons Ltd., London, (1965) at pages 102 to 106.

According to those authorities, the spinel crystal structure may be characterized as comprising oxygen ions in an approximately cubic, close-packed relationship, with the metal ions lying in holes of the packing. Crystal structures having close-packed atoms or ions may be conveniently considered, for purposes of illustration, as being arranged in layers. In the spinel lattice having metal ions and layers of close-packed oxygen ions, the metal ions are smaller than the oxygen ions and are found between the layers of oxygen ions. The relationship within the lattice may be shown by imagining that the layers of oxygen ions are taken apart, leaving associated with each layer of oxygen ions the metal ions immediately in contact with the upper surface of the layer of oxygen ions. In this way the spinel structure may be regarded as built up of two kinds of alternate layers which layers are superposed one on top of the other in an alternating manner. The spinel structure may be further characterized in that one third of the metal ions have 4 oxygen neighbors which oxygen neighbors are arranged tetrahedrally to the metal ion, and that two thirds of the metal ions have 6 oxygen neighbors which oxygen neighbors are arranged octahedrally to the metal ion.

In each of the layers of close-packed oxygen ions are diagonal chains of metal ions having octahedral geometry. The octahedral metal ions are linked laterally above and below the layer of oxygen ions by the metal ions having tetrahedral geometry. The direction of the chains in any layer is normal to the direction of the chains in the adjacent layer. Four layers make up a unit cell.

The unit cell referred to above is an arbitrary parallelopiped which is the smallest repetitive unit identifiable as the crystal. The unit cell generally, as a matter of convenience, conforms to the symmetry of the system to which the crystal belongs. The unit cell is defined by the lengths of its edges, and the angles included between them. The edges of the unit cell are termed unit translations in the pattern. Starting from any point of origin in the lattice and going a distance equal to and parallel to any cell edge, or by any combination of such movements, we arrive at a point where the whole surrounding structure has the same form and orientation as at the point of origin. Because of the arbitrary nature of the definition of the unit cell, any one ion may be entirely within one cell or it may, alternatively, be divided between two, four, or eight unit cells. Additionally, the neighbor of any one ion may be in the same unit cell or in an adjacent unit cell.

The spinel unit cell contains eight "formula weights," i.e., eight $M^{II}M_2^{III}O_4$ units. More particularly, the crystallographic unit cell of the spinel structure contains 32 oxygen ions. There are equivalent positions in this cell for 8 metal ions surrounded tetrahedrally by 4 oxygen ions, and for 16 metal ions surrounded octahedrally by 6 oxygen ions.

Spinels may further be characterized on the basis of which metal ions occupy which positions in the crystal structure. Those spinels wherein the positions of tetrahedral cordination are occupied by the divalent metallic ions and the positions of octahedral coordination are occupied by the trivalent metal ions are "regular" spinels. Those spinels reported in the literature as being "regular" spinels, and their stoichiometric formulae, include: the magnesium-vanadium spinel ($MgV_2O_4$); the zinc-vanadium spinel ($ZnV_2O_4$); the magnesium-chromium spinel ($MgCr_2O_4$); the manganese-chromium spinel ($MnCr_2O_4$); the iron-chromium spinel ($FeCr_2O_4$); the cobalt-chromium spinel ($CoCr_2O_4$); the nickel-chromium spinel ($NiCr_2O_4$); the copper-chromium spinel ($CuCr_2O_4$); the zinc-chromium spinel ($ZnCr_2O_4$); the zinc-manganese spinel ($ZnMn_2O_4$); the zinc-iron spinel ($ZnFe_2O_4$); the cadmium-iron spinel ($CdFe_2O_4$); the copper-cobalt spinel ($CuCo_2O_4$); the zinc-cobalt spinel ($ZnCo_2O_4$); the magnesium-rhodium spinel ($MgRh_2O_4$); the zinc-rhodium spinel ($ZnRh_2O_4$); the magnesium-aluminum spinel ($MgAl_2O_4$); the manganese-aluminum spinel ($MnAl_2O_4$); the iron-aluminum spinel ($FeAl_2O_4$); the cobalt-aluminum spinel ($CoAl_2O_4$); the zinc-aluminum spinel ($ZnAl_2O_4$); the nickel-aluminum spinel ($NiAl_2O_4$); and the calcium gallium spinel ($CaGa_2O_4$).

Other spinels, wherein the tetrahedral positions are occupied by one-half of the trivalent metal ions and wherein the remaining one-half of the trivalent metal ions along with all of the divalent metal ions are in octahedral positions, are characterized as "inverse" spinels. In "inverse" spinels the arrangement of octahedral divalent and octahedral trivalent positions is substantially random. Such spinels, and their stoichiometric formulae, include: the titanium-magnesium spinel ($TiMg_2O_4$); the vanadium-magnesium spinel ($VMg_2O_4$); the magnesium-iron spinel ($MgFe_2O_4$); the titanium-iron spinel ($TiFe_2O_4$); the cobalt-iron spinel ($CoFe_2O_4$); the nickel-iron spinel ($NiFe_2O_4$)

the copper-iron spinel ($CuFe_2O_4$); the titanium-zinc spinel ($TiZn_2O_4$); the tin-cobalt spinel ($SnCo_2O_4$); the tin-zinc spinel ($SnZn_2O_4$); the magnesium-gallium spinel ($MgGa_2O_4$); the magnesium-indium spinel ($MgIn_2O_4$); the manganese-indium spinel ($MnIn_2O_4$); the iron-indium spinel ($FeIn_2O_4$); the cobalt-indium spinel ($CoIn_2O_4$); and the nickel-indium spinel ($NiIn_2O_4$).

In still other spinels, the distribution of metal ions is less regular, the spinels exhibiting both normal and inverse arrangement, as is discussed, for example in Bragg, Claringbull, and Taylor, The Crystalline State, vol. 4; Crystal Structure of Minerals, G. Bell & Sons, Ltd., London (1965) at pages 105 and 106.

Figure 2:
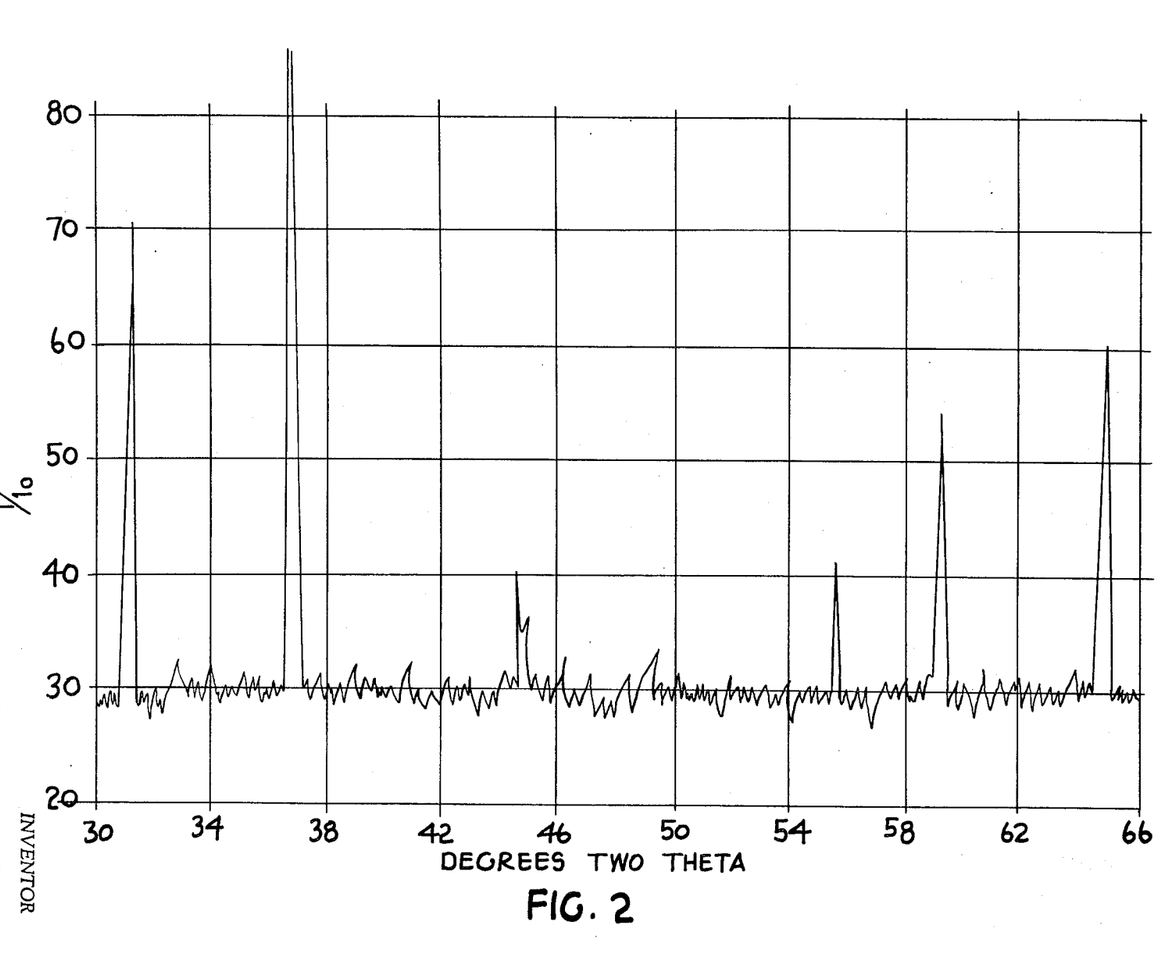
FIG. 2 is an X-ray diffraction pattern of the spinel used in the practice of Example III.

The spinel crystallographic unit gives a unique X-ray diffraction pattern corresponding to the spacings between the crystallographic planes. Typically, the observation of this X-ray diffraction pattern involves subjecting spinel samples to X-rays from a copper target. Methods of accomplishing this are more particularly described in chapter 5 of Klug and Alexander, X-ray Diffraction Procedures, John Wiley and Sons, Inc., New York (1954), at pages 235 to 318, and especially at pages 270 to 318, and in Newfield, X-ray Diffraction Methods, John Wiley and Sons, Inc., New York, N.Y., (1966), at pages 177 to 207. As described therein, these X-rays have a wave length of 1.5405 angstrom units. The X-rays diffracted by the sample are particularly intense at certain angles, $\theta$, resulting in peaks on diffractometer print-outs as FIG. 2, or in lines on photographic diffraction patterns. This high intensity is caused by the X-rays "reflected" from parallel planes in the crystal reinforcing each other. The wave length of the X-rays, the spacing of the planes in the crystal, and the angle, $\theta$, are related by Bragg's Law. Bragg's Law is $$2d \sin \theta = n\lambda$$

where $d$ is the distance between the planes of the crystal, $n$ is an integer, $\lambda$ is the wave length of the X-rays, and $\theta$ is the angle of incidence of the X-rays, and also the angle of reflection of the X-rays.

Typically, the X-ray diffraction data is obtained from a diffractometer that is direct reading in $2\theta$, wherein 180 degrees $-2\theta$ is the angle between the incident ray and the reflected ray. One way of recording X-ray diffraction data is in the form of a graph of the intensity of the reflected ray versus $2\theta$. X-ray diffraction data recorded in this way is shown in FIG. 2.

FIG. 2 is a graph of the intensity of the reflected ray versus $2\theta$ for a sample of $CoAl_2O_4$ spinel powder prepared from the ground, mixed, oxides, as described hereinafter and used in the practice of Example III of this invention. Particularly to be noted is the strong peak at an angle of 36.78 degrees corresponding to an interplanar distance of 2.442 angstroms. The peaks at 31.28 degrees, 59.18 degrees, and 64.98 degrees are of approximately equal intensity but of substantially lower intensity than the peak at 36.78 degrees, and correspond to interplanar distances of 2.864 angstroms, 1.560 angstroms, and 1.434 angstroms. The theoretical interplanar distances, from A.S.T.M., X-ray Powder Diffraction Files (1967) are 2.443 angstroms, 2.864 angstroms, 1.560 angstroms, and 1.432 angstroms, respectively. The high level of background noise is caused by the closeness of cobalt to the copper target in the periodic chart.

Good regenerative effects have been obtained with all spinel coated electrodes tested. Regeneration of electrodes coated with the following spinels, including both regular and inverse spinels, as well as spinels exhibiting both the normal and inverse structure, are contemplated:

The spinels of magnesium, including titanium-magnesium spinel (TiMg$_2$O$_4$), vanadium-magnesium spinel $$(VMg_2O_4)$$

and tin-magnesium spinel (SnMg$_2$O$_4$).

The spinels of vanadium, including magnesium-vanadium spinel (MgV$_2$O$_4$), iron-vanadium spinel (FeV$_2$O$_4$), and zinc-vanadium spinel (ZnV$_2$O$_4$).

The spinels of chromium including magnesium-chromium spinel (MgCr$_2$O$_4$), manganese-chromium spinel (MnCr$_2$O$_4$), iron-chromium spinel (FeCr$_2$O$_4$), cobalt-chromium spinel (CoCr$_2$O$_4$), nickel-chromium spinel (NiCr$_2$O$_4$), copper-chromium spinel (CuCr$_2$O$_4$), zinc-chromium spinel (ZnCr$_2$O$_4$) cadmium-chromium spinel (CdCr$_2$O$_4$), and the chromium-chromium spinel (Cr$_3$O$_4$).

The spinels of manganese, including titanium-manganese spinel (TiMn$_2$O$_4$), zinc-manganese spinel $$(ZnMn_2O_4)$$

and the manganese-manganese spinel (Mn$_3$O$_4$).

The spinels of iron, including magnesium-iron spinel (MgFe$_2$O$_4$), titanium-iron spinel (TiFe$_2$O$_4$), manganese-iron spinel (MnFe$_2$O$_4$), cobalt-iron spinel (CoFe$_2$O$_4$), nickel-iron spinel (NiFe$_2$O$_4$), copper-iron spinel $$(CuFe_2O_4)$$

zinc-iron spinel (ZnFe$_2$O$_4$), cadmium-iron spinel $$(CdFe_2O_4)$$

lead-iron spinel (PbFe$_2$O$_4$), aluminum-iron spinel $$(FeAlFeO_4)$$

and magnetite (Fe$_3$O$_4$).

The spinels of cobalt including magnesium-cobalt spinel (MgCo$_2$O$_4$), titanium-cobalt spinel (TiCo$_2$O$_4$), copper-cobalt spinel (CuCo$_2$O$_4$), zinc-cobalt spinel (ZnCo$_2$O$_4$), tin-cobalt spinel (SnCo$_2$O$_4$), and the cobalt-cobalt spinel (Co$_3$O$_4$).

The spinels of nickel including iron-nickel spinel (FeNi$_2$O$_4$), and germanium-nickel spinel (GeNi$_2$O$_4$).

The spinels of rhodium including magnesium-rhodium spinel (MgRh$_2$O$_4$), cadmium-rhodium spinel (CdRh$_2$O$_4$), cobalt-rhodium spinel (CoRh$_2$O$_4$), copper-rhodium spinel (CuRh$_2$O$_4$), manganese-rhodium spinel (MnRh$_2$O$_4$), nickel-rhodium spinel (NiRh$_2$O$_4$), and zinc-rhodium spinel (ZnRh$_2$O$_4$).

The zinc spinels including titanium-zinc spinel $$(TiZn_2O_4)$$

and tin-zinc spinel (SnZn$_2$O$_4$).

The aluminum-spinels including magnesium-aluminum spinel (MgAl$_2$O$_4$), strontium-aluminum spinel (SrAl$_2$O$_4$), chromium-aluminum spinel (CrAl$_2$O$_4$), molybdenum-aluminum spinel (MoAl$_2$O$_4$), manganese-aluminum spinel (MnAl$_2$O$_4$), iron-aluminum spinel FeAl$_2$O$_4$), cobalt-aluminum spinel (CoAl$_2$O$_4$), nickel-aluminum spinel $$(NiAl_2O_4)$$

copper-aluminum spinel (CuAl$_2$O$_4$), and zinc-aluminum spinel (ZnAl$_2$O$_4$).

The gallium spinels including magnesium-gallium spinel (MgGa$_2$O$_4$), zinc-gallium spinel (ZnGa$_2$O$_4$), and calcium-gallium spinel (CaGa$_2$O$_4$).

The indium spinels including magnesium-indium spinel (MgIn$_2$O$_4$), calcium-indium spinel (CaIn$_2$O$_4$), manganese-indium spinel (MnIn$_2$O$_4$), iron-indium spinel (FeIn$_2$O$_4$), cobalt-indium spinel (CoIn$_2$O$_4$), nickel-indium spinel (NiIn$_2$O$_4$), cadimium-indium spinel (CdIn$_2$O$_4$), and mercury-indium spinel (HgIn$_2$O$_4$).

The spinels containing ions of three metals, such as magnesium-aluminum-iron spinel (MgFeAlO$_4$), and nickel-aluminum-iron spinel (NiFeAlO$_4$).

Better electrolytic results are obtained with aluminate spinels, that is where one or both of the ions present in the plus 3 valence state is aluminum, as in CuAl$_2$O$_4$, CoAl$_2$O$_4$, FeAlFeO$_4$, and NiAl$_2$O$_4$.

Best electrolytic results are obtained with the heavy metal-aluminate spinels, that is where the metal ion present in the plus 2 valence state is iron, cobalt, or nickel, as in Fe$^{II}$AlFe$^{III}$O$_4$, CoAl$_2$O$_4$, and NiAl$_2$O$_4$, and with the heavy metal ferrite spinels, that is, where iron is present in the plus 3 valence state, as in CoFe$_2$O$_4$, MgFe$_2$O$_4$, and NiFe$_2$O$_4$.

Whenever FeAlFeO$_4$ is referred to herein, it is understood that this material may actually be a mixture of Fe$^{II}$Fe$_2^{III}$O$_4$, FeAl$_2$O$_4$, and Fe$^{II}$AlFe$^{III}$O$_4$. This material may be characterized by the presence of iron in both the plus 2 and plus 3 valence states, as well as the presence of aluminum in the plus 3 valence state. Additionally, FeO, Fe$_2$O$_3$, and Al$_2$O$_3$ may also be present.

Preferably, for good electrolytic results, the spinel itself should have some appreciable electroconductivity when measured in bulk. While good results have been obtained with a spinel having an electroconductivity as low as $10^{-5}$ (ohm-centimeters)$^{-1}$, generally the conductivity should be at least $10^{-1}$ (ohm-centimeters)$^{-1}$. Moreover, the thin spinel coatings appear to exhibit greater conductivity as the electrodes are used as anodes in the electrolysis of aqueous sodium chloride to produce chlorine and sodium hydroxide. Thus, some electrocatalytic effect may play a role in the electrolytic processes herein contemplated.

The temperatures which have been resorted to for the preparation of spinels, typically ranging from about 750° C. to about 1350° C., are far above the temperatures which decompose and volatilize various compounds of the oxidation inhibitors and the binding agents and, in a normal atmosphere, oxidize the surface of the substrate. For this reason when the spinel is formed in contact with the substrate, as for example, from mixed oxides of the metals, the substrate or support member may suffer some degree of oxidation and, in such a case, the electrode may show a much higher voltage than is desirable. But when the spinel is formed prior to being applied to the substrate or support member, the highest temperature that the member is exposed to is the higher of either the decomposition temperature of the oxidation inhibitor, where present, or of the binding agent compound, and the degree of oxidation of the member is negligible.

For this reason, it is desirable that the spinel be formed prior to being applied to the support member. This can be accomplished by oxidation of the mixed metals, or by mixing and subsequent heating of the mixed oxides, or by coprecipitation from solutions of compounds of the metals followed by heating or by thermal decomposition of compounds of the mixed metals. The preferred compounds are those which decompose directly to the oxides on heating and do not leave a residue, as carbonates, formates, nitrates, and oxalates, e.g.:

$$CoCO_3 + Al_2(CO_3)_3 \xrightarrow{\Delta} CoO + Al_2O_3 + 4CO_2 \uparrow$$

$$Co(NO_3)_2 + 2Al(NO_3)_3 \xrightarrow{\Delta} CoO + Al_2O_3 + 8NO_2 \uparrow + 2O_2 \uparrow$$

The resulting product is an intimate mixture of the two oxides which can be heated to form the spinel.

Various procedures may be resorted to for the preparation of spinels to be used as electrode surfaces. For example spinels may be prepared from the mixed oxides. Cobalt-aluminate, copper-aluminate, and nickel-aluminate spinels, inter alia, were prepared from the mixed oxides. The general procedure was to grind stoichiometric amounts of the oxides to minus 200 mesh, mix the ground oxides together, place the mixed, ground oxides in a crucible, and heat the mixed, ground oxides, thereby forming the spinel.

Another mixed oxide procedure may be utilized for the iron-aluminum spinel having the stoichiometric formula $Fe^{II}(Fe^{III}Al)O_4$. By this method the iron-aluminum spinel is prepared from the mixed oxides $Fe_2O_3$, FeO, and $Al_2O_3$ according to the following procedure described in Blue and Claassen, Journal of the American Chemical Society, 71, 3839 (1949) and Coughlin, King and Bonnickson, Journal of the American Chemical Society, 73, 3891 (1951).

According to the procedure described therein FeO is first prepared by heating metallic iron and $Fe_3O_4$ in the presence of water vapor. The reactions believed to be taking place are:

$$Fe + H_2O \rightarrow FeO + H_2$$
$$Fe_3O_4 + H_2 \rightarrow 3FeO + H_2O$$

The FeO prepared as described above, $Fe_2O_3$ and $Al_2O_3$, all ground to minus 200 mesh were mixed and heated under a vacuum for a period in excess of eight hours at a temperature of about 110° C. The material is then heated to 1200° C., under vacuum, for 24 hours. The resulting product was a black, magnetic material exhibiting the X-ray diffraction pattern reported in the literature to be characteristic of the $Fe^{II}(Fe^{III}Al)O_4$ spinel.

Spinels may be prepared by precipitation from nitrate solution, followed by oxidation of the precipitate to yield the spinel. Copper-aluminate, copper-chromite, copper-ferrite, cobalt-aluminate, and cobalt-chromate spinels, inter alia, were prepared by precipitation from the nitrate solutions. The general procedure was to prepare an aqueous solution 0.5 molar in the nitrate salt of the divalent metal and 1.0 molar in the nitrate salt of the trivalent metal. This solution was evaporated to dryness by heating the solution to a temperature between 125° C. and 140° C. The dried product was then heated in an air-aspired furnace to drive off the nitrogen compounds, yielding thereby a mixed oxide. The mixed oxide was then ground to a powder which was then heated in a furnace to a temperature sufficiently high to form the spinel.

Spinels useful for electrode coatings may also be prepared by precipitation from oxalate solution and subsequent oxidation. A solution of stoichiometric quantities of the sulfate salts of the metals was prepared in distilled water. The solution was then filtered. The filtered solution was heated to boiling, and ammonium oxalate and oxalic acid were added to the solution with stirring. Boiling and stirring were continued until a precipitate appeared. The resulting precipitate was filtered and washed. The washed precipitate was then dried and the dried product placed in a porcelain crucible and heated to a temperature of 500° C., held at the temperature of 500° C. for 10 minutes, and then slowly cooled to room temperature. The resulting product was ground to minus 200 mesh and then heated to 950° C. and held at 950° C. for 7½ hours, thereby yielding the spinel.

Spinels may also be prepared by ammonium carbonate precipitation from the chloride solution. Nickel chromate, nickel aluminate, cobalt aluminate, and copper chromate spinels, inter alia, were prepared by precipitation from chloride solutions. The general procedure was to prepare a solution containing the chloride salts of the di- and trivalent metals. To this solution was added ammonium carbonate. The solution was then stirred under a nitrogen blanket and the precipitate which formed was separated by centrifuging under a nitrogen atmosphere. The centrifugate was dried under a nitrogen atmosphere and the solid material ground and heated under vacuum for 72 hours, thereby yielding the spinel.

Spinels have also been prepared by ammonium hydroxide precipitation from the chloride solution. In this procedure, a solution was prepared from stoichiometric quantities of the two chlorides. To this solution was added a concentrated solution of ammonium hydroxide. The resulting mixture was stirred until a precipitate appeared. The resulting precipitate was separated and dried. The dried precipitate was ground to minus 100 mesh and then placed in a covered crucible which was placed in a vacuum furnace under a vacuum of $10^{-5}$ millimeters of mercury and heated. The material was heated to a temperature of 900° C. or greater and maintained thereat for 24 hours, thereby yielding the spinel.

Depending on the method of forming the mixed oxide and the degree of comminution thereof, it is possible that all of the mixed oxide will not necessarily be converted to a spinel but that some will remain as the original oxide. This has no deleterious effect on the anode. The less soluble oxides, as $Al_2O_3$, will remain on the anode without deleterious effect, while the more soluble oxide, as CoO or NiO, may be dissolved by the anolyte when the finished electrode is employed as an anode.

Also $Fe_2O_3$ and $Al_2O_3$ reportedly have structures which permit significant quantities of either or both to be present in the spinel lattice without deleterious effects, and without being readily detectable by X-ray diffraction.

As explained hereinbefore, the preferred spinel usually is applied together with a binding agent. These agents include organometallic compounds which, on heating, decompose to the metal or metal oxide and volatiles as well as more permanent binders.

Typically, regardless of the substrate, the spinel must be made to adhere to the substrate. This may be accomplished by providing a lattice or network within the spinel, with a suitable permanent binding agent, whereby the adherence of the spinel to the substrate is enhanced.

A suitable permanent binding agent has to be impervious to the chlorine environment of the electrolytic cell as for instance a metal compound, such as an oxide, sulfide, nitride, boride, or carbide of titanium, tantalum, niobium, aluminum, bismuth, tungsten, zirconium, hafnium, vanadium, chromium, or silicon. It has been found that particularly good binding results are obtained by the formation, in situ with the spinel coating, of a metal oxide that is substantially non-reactive with the anolyte. The formation of this oxide, in situ, must, moreover, take place at a temperature below the temperature at which any appreciable oxidation of the structural member occurs or any adverse effect on the undercoat occurs. For this reason, the thermal decomposition of a readily decomposed compound having volatile decomposition products as, for instance, an oxylate, carbonate, hydroxide, hydrated oxide, or resinate of titanium, tantalum, silicon, molybdenum, aluminum, bismuth, zirconium, hafnium, tungsten, niobium, or vanadium may be used. Generally the more permanent binders are inorganic. Titanium compounds are preferred. Whenever titanium dioxide is described as a binding agent, it will be understood that other binding agents as herein described may be used in lieu of or in addition thereto.

Small concentrations of the permanent binding agent are effective. Satisfactory results in terms of activity of the anode and the durability thereof have been obtained at titanium dioxide concentrations of from about 3.5 percent by weight (calculated as titanium metal) of the spinel surface coating to about 30 percent by weight (calculated as titanium metal) of the surface coating. Although it is possible to prepare electrodes using less than about 3.5 weight percent of the binding agent in the surface coating, spinel losses will be significant. With too great a concentration of a binding agent such as titanium dioxide, i.e., amounts above 30 weight percent of the surface coating (calculated as the metal), the anode activity will be influenced materially by the titanium dioxide. Titanium dioxide concentrations of from about 7 weight percent (calculated as titanium metal) to about 15 weight percent (calculated as titanium metal) are preferred.

In order to effectuate intimate mixing of the spinel and the permanent binder, both are put into a liquid medium. Either water or an organic solvent may be used. It is particularly important that the binding agent be dispersed in the liquid medium and that the spinel be in a fine enough state of subdivision that it is also readily dispersed in the liquid medium. Saturated aliphatic and aromatic liquid hydrocarbons yield satisfactory results. Better results are obtained with saturated aliphatic and aromatic liquid hydrocarbons having from 6 to 10 carbon atoms, as benzene, toluene, cumene, hexane, and cyclohexane. Toluene is preferred.

In one exemplification the spinel surface coating containing titanium dioxide binder is provided by applying a slurry of the spinel ground to minus 325 mesh and containing titanium resinate. Specifically, such a slurry is prepared by adding 0.5 gram of ground spinel to 3.0 grams of toluene and 1 gram of titanium resinate solution (containing 4.2 weight percent of titanium calculated as metal). This is vigorously stirred, providing a suspension which will not settle out for a period of from about 30 seconds to about 1 minute. Within this period and while the suspension still exists it is brushed onto the substrate which is then heated to a temperature of about 500° C. A plurality of such brushings and subsequent heatings are performed until the spinel content is built up to the desired thickness, usually the process of brushing and heating being repeated by about 7 to about 20 times.

When the spinel is applied in this way, it is likely that the resulting surface will exhibit some degree of porosity. For example, after 5 coats of a slurry comprising minus 325 mesh spinel, titanium resinate, and toluene have been applied, it is possible to optically observe at a magnification of 150 times the layers of material (as the substrate and the intermediate layers between the substrate and the spinel) between individual spinel fragments. The surface under such magnification exhibits considerable irregularities, as ridges, valleys, peaks, crystal boundaries, and breaks.

It is to be understood that satisfactory electrodes may also be prepared without heating after every coat of spinel so long as the resinate is ultimately decomposed. The resulting surface, on the order of about 200 to about 400 micro-inches thick, has on the order of about 0.02 to about 0.04 gram of spinel per square inch of spinel coated anode surface. Thicker coatings, rarely in excess of about 500 micro-inches in thickness, may also be applied in this manner.

The heating of the spinel slurry coating to form the desired surface bonded to the substrate may take place in air. While it may also take place under an inert atmosphere, as helium, argon, neon, krypton, xenon, carbon dioxide, or nitrogen, or other relatively inert gases, care must be taken to avoid recourse to temperatures or other conditions which cause the spinel lattice to break down. Thus, the presence of some oxygen in the surrounding atmosphere will prevent or minimize such breakdown of the spinel lattice.

The heating may take place at atmospheric pressure, or at a total pressure below atmospheric pressure, or at a total pressure above atmospheric pressure. The heating may also take place at a standard partial pressure of oxygen (approximately 2.6 pounds per square inch partial pressure of oxygen), or at a lower or higher partial pressure of oxygen, typically at oxygen partial pressures of from about $10^{-6}$ millimeters of mercury to about 15 pounds per square inch. Satisfactory results are obtained at normal atmospheric total pressure and at normal atmospheric partial pressure of oxygen. Satisfactory results may also be obtained by heating under an atmosphere having a standard atmospheric total pressure but a reduced partial pressure of oxygen as, for example, an inert atmosphere. Satisfactory results may also be obtained by heating under a total pressure greater than 14.7 pounds per square inch absolute and a partial pressure of oxygen less than 2.6 pounds per square inch absolute, as, for example, under a relatively inert gas atmosphere at a total pressure in excess of 14.7 pounds per inch. When, however, the heating takes place under a partial pressure of oxygen below the normal atmospheric partial pressure of oxygen, care must be exercised to prevent breakdown of the spinel lattice.

Any suitable electroconductive material resistant to attack by the chlorine cell environment may be used as the substrate or support member of the electrode useful as an anode for brine electrolysis and which may be regenerated by the method of this invention. Most commonly used as the "valve" metals; that is, those metals which form a passivating oxide film, conductive only in the cathodic direction. The valve metals include titanium, tantalum, tungsten, hafnium, zirconium, aluminum, and columbium and alloys thereof. Such valve metals typically have an electrical conductivity of about $10^5$ (ohm centimeters)$^{-1}$ to about $10^6$ (ohm centimeters)$^{-1}$, and have an oxide coating having an electrical conductivity of from about $10^{-13}$ (ohm centimeters)$^{-1}$ to about $10^{-11}$ (ohm centimeters)$^{-1}$. Titanium and tantalum are preferred. Titanium yields best results. Carbon and graphite may also be used. These materials have a conductivity considerably greater than that of the spinel, usually being $10^3$ (ohm centimeters)$^{-1}$ or higher. In accordance with a preferred embodiment, the metal substrates are such that they will not normally permit bulk permeation of gases through the metal itself. Electrodes made of such gas impermeable metal substrates include electrodes contemplated herein having a metal mesh substrate wherein the metal substrate itself is substantially gas impervious, although the gases may pass through the openings in the mesh of the electrode.

The support members may be in the form of a solid structural member or of a thin imperforate plate, for example, up to about ¼ inch thick. Alternatively, the support may be perforate or foraminous or mesh. They can be of any shape appropriate for anodes to be used in electrolytic cells. When anodes having perforate or foraminous supports are used in mercury cells, they may be totally or only partially immersed in the electrolyte. When totally immersed in the electrolyte, only the surface of the anode facing the flowing cathode need be coated with the spinel anodic surface, or all of the surfaces of the anode may be coated with the spinel anodic surface. Likewise, when such anodes having perforate or foraminous supports are used in diaphragm cells, either one surface or both surfaces of the support may be coated with the spinel anodic surface.

In most cases even when the spinel is applied following the above procedure directly to an untreated valve metal metallic substrate, as commercial grade titanium metal, in the presence of oxygen, the voltage drop across the cell with such an anodic surface is very high—on the order of about 10 volts. This increased voltage appears to be caused by the formation of oxides of the metal used in fabricating the substrate at the spinel-substrate interface. While not wishing to be bound by this explanation, it is believed that either some actual oxidation of the unprotected bulk titanium or like metal takes place at the spinel-substrate interface or that there is some migration or intermetallic diffusion of oxygen atoms into the bulk metal, or possibly that the spinel itself may tend to oxidize the substrate.

These difficulties may be avoided and the interval between successive regenerative heatings of this invention increased by interposing between and in electrical contact with the metal substrate, e.g., titanium metal, and the outer spinel surface a layer which is more resistant to oxidation than is the titanium or like metal base and which itself is electroconductive, preferably at least as electroconductive as the titanium or like metal base itself.

Especially advantageous results are obtained when the interposed layer is itself resistant to anodic attack in the environment to which the electrode is to be exposed. Especially good results have been obtained by the application of an intervening layer of a platinum group metal, platinum group metal oxide, or mixtures thereof between the spinel and the titanium or like metal base to inhibit this oxidation and/or to prevent or minimize this undesirably high anode voltage drop. All the platinum group metals as ruthenium, rhodium, palladium, osmium, iridium, and platinum applied as an intermediate layer in the metallic state provide electrodes having lower voltages than in the case when the spinel is applied directly to the valve metal member. Such platinum group metals generally have an electrical conductivity of from about $10^5$ (ohm centimeters)$^{-1}$ to about $10^6$ (ohm centimeters)$^{-1}$. The oxides of the platinum group metals as ruthenium oxide, rhodium oxide, palladium oxide, osmium oxide, iridium oxide, and platinum oxide also are effective for this purpose, as are the sulfides thereof.

This intervening layer may be provided by a mixture of oxides of platinum group metals of the second transition series as ruthenium, rhodium, and palladium with oxides of platinum group metals of the third transition series as osmium, iridium, and platinum. Such specific oxide mixtures include ruthenium oxide and osmium oxide, ruthenium oxide and iridium oxide, ruthenium oxide and platinum oxide, rhodium oxide and osmium oxide, rhodium oxide and iridium oxide, rhodium oxide and platinum oxide, palladium oxide and osmium oxide, palladium oxide and iridium oxide, and palladium oxide and platinum oxide.

This intervening layer may also be provided by a mixture of oxides of platinum group metals of the second transition series, with platinum group metals of the third transition series. Such specific mixtures include ruthenium oxide-osmium, ruthenium oxide-iridium, ruthenium oxide-platinum, rhodium oxide-osmium, rhodium oxide-iridium, rhodium oxide-platinum, palladium oxide-osmium, palladium oxide-iridium and palladium oxide-platinum.

Good results are also obtained with alloys or mixtures of the platinum group metals of the second transition series with alloys of platinum group metals of the third transition series such as alloys or mixtures of ruthenium and osmium, ruthenium and iridium, ruthenium and platinum, rhodium and osmium, rhodium and iridium, rhodium and platinum, palladium and osmium, palladium and iridium, palladium and platinum. Additionally, good results are also obtained with mixtures or alloys of the platinum group metals.

The intervening layer may also be provided by an alloy of the metal used in fabricating the substrate (i.e., a valve metal such as titanium) with a metal of the platinum group as, for example, titanium alloyed with one or more of the following: ruthenium, rhodium, palladium, osmium, iridium, or platinum.

In preparing electrodes according to this embodiment in which a protective, conductive layer is placed between the substrate and the spinel, typically the titanium or like substrate is first etched or otherwise treated to remove the naturally-occurring oxide coating, typically with hydrofluoric and hydrochloric acids. It is then coated with a metal of the platinum group. In one embodiment the metallic substrate member is coated with a solution of a compound of a platinum group metal. The compound should be readily thermally decomposable and yield, as products of decomposition, volatiles and either the metal or an oxide of the metal. Typically used are carbonates, chloride, formates, nitrates, oxides, oxalates, and resinates of the platinum group metals such as platinum resinate. Alternatively, the oxidation-inhibiting coating of the platinum group metal may be electrodeposited onto the structural member. While still another embodiment of this invention, the platinum group metal may be clad to the structural member sprayed on the substrate, or even roller coated as a molten metal thereupon.

It is not necessary to apply pure platinum to the substrate since oxidation and corrosion-resistant alloys or mixtures of platinum such as platinum-iridium, platinum-osmium, or like alloys or mixtures may be applied. Moreover, mixtures or alloys of platinum group metals and/or their oxides and other materials, notably other metals or their oxides, may be applied. For example, the coating may comprise mixtures or alloys of: platinum and chromium, nickel, or cobalt in the metallic state, or mixtures of alloys of these non-precious metals with other platinum group metals, e.g., iridium, osmium, or the like. Also, platinum group metals mixed with corrosion-resistant oxides of metals such as the oxides of titanium, silicon, tungsten, chromium, nickel, cobalt, or vanadium. These may be applied simply by adding a resinate of the desired non-precious metal to the platinum resinate and following the procedures of Example I hereinafter. A mixture of platinum metal and ruthenium oxide may be applied by applying a mixture of their resinates according to such example. Similarly, the mixtures of platinum metal oxides and the non-precious metal oxides may be provided as an intermediate layer by applying a mixture of precious metal resinate and the resinate of the non-precious metal to the titanium coupon of Example I in lieu of the platinum resinate. As a general rule, the intervening layer or undercoat should contain at least 40 percent to 50 percent by weight of the platinum group metal and/or oxide thereof.

The actual effect of the platinum group metal is not clearly understood; and it is not certain that it functions as an actual physical protection of the member. Rather, it appears to be a chemical or oxidation-inhibiting effect; that is, it appears to make the substrate less receptive to either actual oxidation or to the migration of oxygen.

Very thin layers of the protective layer, e.g., platinum group metal oxide, are effective. Satisfactory resutls have been achieved with the application of only three coats of a platinum resinate prior to applying the spinel. X-ray data indicate that the platinum group metal coatings of thicknesses from about 1 or 2 to about 10 micro-inches are sufficient to give the desired result. By way of comparison, 10 micro-inches of platinum do not produce a satisfactory platinized titanium electrode where the platinum itself is the electrolyzing surface; a fairly-thick, uniform platinum layer of greater than about 20 micro-inches being required in that case.

Alternatively, the intermediate coating may be applied by inserting the previously-etched titanium or like metal member in a bath of electroconductive organic solvent and a compound of a platinum group metal. The titanium or like metal member may then be used as a cathode for the cathodic electrodeposition of the platinum group metal onto said titanium or like metal base cathode.

The platinum group metal compound may be present in the organic electrolyte as a solute or, alternatively, may be present in the form of small globules. After receiving the intermediate protective layer of platinum group metal or the like, the member is ready to receive a spinel coating.

Such expedients as hereinabove described involving the use of an intervening layer of a precious metal between the metal substrate and the spinel surface reduce the required frequency of regenerative vacuum heatings.

While the spinel coating may be applied with effective results according to the methods described previously, in a general manner, other methods may also be resorted to. Thus, the spinel, in the form of a fine powder, may be pressed onto the substrate. Thereafter, the substrate with the powder coating is subjected to a compressive force. The compressive force is in excess of one ton per square inch, and, typically, on the order of about 10 to 20 tons per square inch. Such forces may be obtained conveniently by passing the structural member with the finely-powdered spinel thereon between rollers held in compression. By this procedure, a compressive point force in excess of two tons per square inch may be applied to the finely-powdered spinel and the substrate.

According to a further embodiment, the titanium or like metal base cleaned of oxide may be disposed as a cathode in an aqueous or electroconductive non-aqueous suspension of spinel powder with or without titanium oxide, or hydroxide, or aluminum hydroxide, or titanium resinate, and globules of a binder which migrates upon imposition of an electromotive force between a pair of electrodes to the cathode substantially as described in Ranney, Electrodeposition and Radiation Curing of Coatings, Hayes Data Corp., Park Ridge, N.J. (1970), pp. 101–109, to form a coating. This process is effective to produce a spinel coating of lower porosity. Furthermore thicker coatings may be applied in a single coating operation. The substrate may then be heated to volatilize or burn up the organics and bond the oxide to the base described above. By maintaining the cleaned titanium member cathodic during the entire period that the titanium is in contact with the electrolyte and until the coating is deposited, the intervening layers of platinum or the like may be dispensed with, although even in this case recourse to the intervening platinum or like layer is desirable.

In another embodiment, an alloy of two or three metals of the spinel may be electrodeposited directly upon a titanium substrate or upon a platinum or like coating on the substrate. The alloy coating which preferably should contain the metals substantially in the proportion of the spinel may then be heated in oxygen to oxidize the surface and to thereby form the spinel.

While the electrode substrates with which this invention may be used have been particularly described with reference to a titanium substrate which serves as the electroconductive base, it is to be understood that other materials may be used for the substrate. For example, the electrode base may be steel or other electroconductive base clad with a thin sheet or coating of titanium and in electrical contact therewith. The titanium coating or sheet may thus be coated with a spinel or with the platinum type interlayer and then with the spinel. While an interlayer of platinum group metal or an oxide of a platinum group metal is especially valuable because such materials are themselves resistant to anodic corrosion and have good electroconductivity and low overvoltage, other materials also may be used. As an example, the following electroconductive materials may be deposited upon the titanium or like chemically-resistant base with the spinel deposited on the coating of these materials: sulfides of platinum group metals, calcium ruthenate, titanium hydride, zirconium hydride, metallic nickel or cobalt or chromium, or corrosion-resistant alloy of chromium.

The procedure of this invention may also be used with electrodes having the spinel coating applied upon an electroconductive titanium hydride substrate. Such titanium hydride substrates may be prepared by powder metallurgy techniques, or by chemical reaction of the titanium. When a titanium hydride member is used as the electroconductive substrate, the spinel outer surface may be applied by any of the methods described above, as decomposition of an organic liquid containing the ground up spinel, or electroless deposition, or cathodic electrodeposition. Alternatively, the titanium hydride substrate may be a titanium hydride surface upon a titanium metal substrate. Such a surface may be provided by etching the titanium metal substrate in a strong inorganic acid, as concentrated hydrochloric acid. When a titanium hydride substrate is used, the spinel may be applied directly to the surface of the titanium hydride substrate. Alternatively, an oxidation-inhibiting layer as described above, comprising a metal of the platinum group, an oxide of a metal of the platinum group, or an alloy thereof, may be interposed between the hydride and the spinel.

A platinum group metal compound or the platinum group metal compounds may be applied simultaneously with the spinel to provide an outer surface comprising both the spinel and the platinum metal or oxide. In such a case, the spinel is generally in excess of the platinum group metal on an atomic basis.

The spinel surface, applied with a permanent binding agent, as described above, is relatively thin—on the order of about 100 micro-inches to about 500 micro-inches—and subject to abrasion. For these reasons, physical protection of the spinel surface during, for example, shipment, storage, or installation, may be effected by the use of a compatible, water-soluble, polymeric protecting coating.

Natural proteins, agar-agar, and gelatin, among others, function acceptably in this capacity. A commercial polymer, such as Stein-Hall "F-3" (T.M.), an anionic, water-soluble polymer, dispersed in water, gives a satisfactory protective coating.

The amount of polymer required is only enough to give a protective coating, typically from about one half a gram of polymer per square foot of anode surface to about two grams of polymer per square foot of anode surface. The protective coating is completely dissolved after several minutes' contact with the electrolyte.

This protective coating is typically applied to the electrode after it has been regenerated in order to protect the spinel surface from abrasion.

Additionally, especially where there has been abrasion of the spinel surface during previous handling of the electrode, one or more coatings of the spinel and binding agent slurry may be applied to the electrode. This may be done prior to the regenerative heating, using the regenerative heating to volatilize and drive off the liquid medium. Alternatively, the additional coatings may be applied after the regenerative heating process of this invention.

The regenerative procedure of this invention is also useful with electrodes wherein the spinel is dispersed in a glass binder. In the preparation of such electrodes, the spinel is dispersed in a fluxing agent prior to being applied to the structural member, thereby providing a more durable coating.

The fluxing agent should have a normal melting point, of from about 700° C. to about 800° C. The fluxing agent should also be resistant to the anolyte environment of the alkali-chlorine electrolytic cell. Glass frits slurried in water solution may be used.

Frits having a melting point in the desired range are generally comprised of mixed oxides and silicates of lead, potassium, zinc, boron, calcium, aluminum, and barium. They typically have from about 70 weight percent to about 80 weight percent lead oxides, about 1 weight percent silica, 10 to 16 weight percent zinc oxide, and about 10 weight percent boron oxide. The silica is present in the form of silicates. Various other compounds, as bismuth oxide, tin oxide, selenium oxide, tellurium oxide, and titanium dioxide may also be present in the frit.

The fluxing agent is ground to minus 325 mesh and slurried; typically, using water as the liquid. The ground frit constitutes from about 60 to about 80 weight percent of the slurry. The spinel, ground to minus 325 mesh, is added to the slurry such that there is from 1.5 to 7 parts of spinel to 1 part of fluxing agent by weight. Better results are obtained when there is from 2 to 4 parts of spinel to 1 part of fluxing agent by weight.

This slurry is applied to a substrate which typically has been etched and thereafter provided with a protective sublayer (as by being treated with a compound of a platinum group metal as described previously). The member is heated to melting point of the flux and held at that temperature for a short time—typically from about 1 to about 10 minutes.

Alternatively, the platinum group metal or compound, preferably in the form of an oxide may be applied with a fluxing agent, and the spinel-flux coating may be applied above the platinum group metal-flux or platinum group metal oxide-flux coating. In still another variation of this exemplification, the platinum group metal or metal oxide is dispersed in the spinel-flux coating as well.

The following specific examples are illustrative:

EXAMPLE I

An electrode having a magnesium-iron spinel on a titanium substrate was prepared according to the following procedure:

A titanium metal coupon 2¾ inches long by 2 inches wide by 1/16 inch thick, was scrubbed with household cleanser, rinsed with distilled water, and then with acetone. It was then dipped in a 1 percent hydrofluoric acid solution at room temperature for 1 minute. The coupon was then etched in a 37 percent hydrochloric acid solution. The etching temperature varied from 45° C. to 50° C. and the etching time was approximately two hours. After etching in the hydrochloric acid solution, the coupons were immersed in running, distilled water for 2 minutes and then air dried.

The magnesium iron spinel was made by preparing solution of 27 grams (0.225 mole) of $MgSO_4$, and 62 grams (0.407 mole) of $FeSO_4$ in two liters of distilled water. The solution was then filtered. The filtered solution was heated to boiling and 78 grams (0.632 mole) of ammonium oxalate and 2.3 grams (0.019 mole) of oxalic acid were added to the solution with stirring. Boiling and stirring were continued for two hours during which a precipitate appeared. The resulting precipitate was filtered on a glass filter and washed with 3 liters of distilled water. The washed precipitate was then dried in an oven exposed to the atmosphere at 105° C. for 3 hours. The product was then placed in a porcelain crucible and heated at a rate of 50° C. per 5 minutes to a temperature of 500° C. It was held at the temperature of 500° C. for 10 minutes and then cooled to room temperature over a 16-hour period. The resulting product was ground to minus 200 mesh and then heated to 950° C. and held at 950° C. for 7½ hours. The resulting product was subjected to X-ray diffraction and showed the X-ray diffraction pattern reported in the literature to be characteristic of the $MgFe_2O_4$ spinel.

The spinel so prepared was ground to minus 325 mesh. To 0.5 gram of the ground spinel were added 2.0 grams of toluene, 0.04 gram of a 0.1 weight percent (calculated as the metal) ruthenium resinate solution, and 2.0 grams of titanium resinate solution (having a titanium content of 4.2 weight percent titanium calculated as metallic titanium). This was vigorously stirred, providing a suspension which did not settle out for a period of from about 30 seconds to about 1 minute. Within this period and while the suspension still existed, it was brushed onto the coupon. After each coat, the coupon was heated at the rate of 50° C. per 5 minutes to the temperature indicated in the following table and maintained at that temperature for 10 minutes.

The temperatures used for each coat were:

| Coat number: | Temperature ° C. |
|---|---|
| 1 | 400 |
| 2 | 400 |
| 3 | 400 |
| 4 | 400 |
| 5 | 400 |
| 6 | 500 |
| 7 | 400 |
| 8 | 400 |
| 9 | 500 |
| 10 | 550 |

This procedure resulted in a spinel coating composition on the surface of the coupon of from about 0.02 gram per square inch of surface to about 0.03 gram per square inch of surface, and a total coating thickness of about 400 micro-inches.

The electrode so prepared, having a $MgFe_2O_4$ surface on a titanium substrate, was then utilized as the anode in a beaker chlorate cell. The chlorate cell was a 1500 milliliter beaker. The beaker contained a 300 grams/liter solution of sodium chloride at a temperature of 45° C. to 55° C. The cathode of the cell was platinized titanium having the same surface area as the anode. Electrolysis was conducted until, at a current density of 25 amperes per square foot, the voltage measured across the cell was 9.5 volts.

The anode was removed from the cell and placed in a vacuum furnace. The anode was heated to a temperature of 875° C. under a vacuum of 5 microns of mercury, and held at 875° C. for 30 minutes. The electrode was then cooled to 800° C., under a vacuum of $10^{-5}$ millimeters of mercury, and held at 800° C. for 30 minutes. The electrode was cooled to room temperature being under a vacuum until a temperature of 325° C. was attained.

The electrode was re-inserted in the beaker chlorate cell and utilized as an anode therein as hereinabove described. At a current density of 500 amperes per square foot, the voltage measured across the cell was 3.55 volts.

EXAMPLE II

An electrode was prepared having a $MgFe_2O_4$ surface on a titanium metal substrate. A titanium coupon was cleaned and etched as described in Example I hereinabove.

Magnesium-iron spinel ($MgFe_2O_4$) was prepared as described in Example I hereinabove. A liquid composition was prepared containing 1.0 gram of the spinel, 4.0 grams of the above-described titanium resinate solution, and 4.0 grams of toluene. As described in Example I hereinabove, this liquid composition was applied directly to one face of the etched titanium coupon (i.e., there was no intermediate platinum group metal or metal oxide coating between the spinel and the titanium coupon). The method of applying the spinel surface was as described in Example I hereinabove.

The resulting electrode, having a magnesium-iron spinel surface directly on a titanium substrate was utilized as the anode in a beaker chlorate cell as described hereinabove. After a period of electrolysis the voltage across the cell was 8.7 volts at a current density of 50 amperes per square foot.

The anode was removed from the cell and placed in a vacuum furnace. The anode was heated to a temperature of 875° C. under a vacuum of 5 microns of mercury and held at 875° C. for 30 minutes. The electrode was then cooled to 800° C. under a vacuum of $10^{-5}$ millimeters of mercury, and held at 800° C. for 30 minutes. The electrode was cooled to room temperature, being maintained under a vacuum until a temperature of 325° C. was attained.

The electrode was re-inserted in a breaker chlorate cell and utilized as an anode therein as hereinabove described. At a current density of 500 amperes per square foot, the voltage across the cell was 3.65 volts.

EXAMPLE III

An electrode was prepared having a cobalt-aluminate spinel ($CoAl_2O_4$) surface on a titanium metal substrate. A 2 inch by 2¼ inch by 1/16 inch titanium metal coupon was cleaned and etched as described in Example I hereinabove. Cobalt-aluminate was prepared by separately grinding 2.067 grams of CoO and 2.811 grams of $Al_2O_3$ to minus 200 mesh. The ground oxides were mixed together and placed in an alundum crucible. The ground, mixed oxides, in the alundum crucible, were placed in a furnace that was exposed to the atmosphere, and heated to a temperature of 1200° C. for 24 hours. The mixed oxides were thereafter heated to a temperature of 1300° C. for an additional 24 hours. The resulting product was deep blue in color and had the X-ray diffraction pattern reported in the literature to be characteristic of cobalt-aluminate spinel.

The spinel so prepared was ground to minus 325 mesh. To 1.0 gram of the ground spinel were added 6.0 grams of toluene. To this was added 2.0 grams of titanium resinate solution (having a titanium content of 4.2 weight percent titanium calculated as metallic titanium). This was vigorously stirred, providing a suspension which did not settle off for a period of from about 30 seconds to about 1 minute. Within this period and while the suspension still existed, it was brushed directly onto one face of the etched coupon (i.e., there was no intermediate platinum group metal or metal oxide coating on the coupon). After each coat, the coupon was heated at the rate of 50° C. per 5 minutes to the temperature indicated in the following table and maintained at that temperature for 10 minutes. The temperatures used for each coat were:

| Coat number: | Temperature, ° C. |
|---|---|
| 1 | 400 |
| 2 | 400 |
| 3 | 400 |
| 4 | 450 |
| 5 | 500 |
| 6 | 400 |
| 7 | 400 |
| 8 | 400 |
| 9 | 400 |
| 10 | 450 |
| 11 | 500 |

This procedure resulted in a spinel coating composition on the surface of the coupon of from about 0.02 gram per square inch of surface to about 0.03 gram per square inch of surface, and a total coating thickness of about 400 micro-inches.

The electrode was inserted in a beaker chlorate cell and utilized as the anode thereof as described in Example I hereinabove. After an extended period of electrolysis the voltage across the cell was 8.06 volts at a current density of 27 amperes per square foot.

The electrode was removed from the cell and inserted in a vacuum furnace. A vacuum of $10^{-5}$ millimeters of mercury was established, and the electrode was heated, under vacuum, to a temperature of 950° C. and maintained thereat, under a vacuum of $10^{-5}$ millimeters of mercury for 1 hour.

Thereafter the electrode was cooled to room temperature, removed from the vacuum furnace, and reinserted in the beaker chlorate cell. At a current density of 100 amperes per square foot, the voltage across the cell was 3.68 volts.

EXAMPLE IV

An electrode was prepared having a cobalt aluminate spinel ($CoAl_2O_4$) surface on a titanium metal substrate with a platinum layer therebetween.

A 2 inch by 2¼ inch by 1/16 inch titanium metal coupon was cleaned and etched as described in Example I hereinabove.

A platinum resinate solution was used to obtain an undercoating on the cleaned and etched titanium coupon. The solution was prepared by mixing 30 grams of "Engelhard 05–X" (T.M.) platinum resinate (containing 7.5 weight percent platinum calculated as the metal) with 27 grams of toluene. This yielded a solution containing 4 weight percent platinum calculated as the metal. The solution was brushed onto one side of the coupon. The coupon was heated at a rate of 50° C. per 5 minutes to a temperature of 500° C. and maintained at 500° C. for 10 minutes.

Cobalt aluminate spinel ($CoAl_2O_4$) was prepared as described in Example III hereinabove. Eleven coats of cobalt aluminate spinel were applied to the platinized face of the coupon as described in Example III hereinabove.

The electrode was inserted in a beaker chlorate cell and utilized as the anode thereof as described in Example I hereinabove. After an extended period of electrolysis the voltage across the cell was 5.05 volts at a current density of 500 amperes per square foot.

The electrode was removed from the cell and inserted in a vacuum furnace. A vacuum of $10^{-5}$ millimeters of mercury was established, and the electrode was heated, under vacuum, to a temperature of 950° C. and maintained thereat, until a vacuum of $10^{-5}$ millimeters of mercury for one hour.

Thereafter the electrode was coated to room temperature, removed from the vacuum furnace, and reinserted in the beaker chlorate cell. At a current density of 500 amperes per square foot, the voltage across the cell was 4.15 volts, thereby showing a 0.9 volt improvement.

EXAMPLE V

An electrode was prepared having a cobalt ferrite spinel ($CoFe_2O_4$) surface on a titanium metal substrate.

A 2 inch by 2¼ inch by 1/16 inch titanium metal coupon was cleaned and etched as described in Example I hereinabove.

Cobalt ferrite spinel ($CoFe_2O_4$) was prepared from the resinates. A solution was prepared containing 2.8 grams of iron resinate solution (4.2 weight percent iron calculated as the metal), 2.0 grams of cobalt resinate solution (3.1 weight percent cobalt calculated as the metal), 3.6 grams of titanium resinate solution (4.2 weight percent titanium calculated as the metal), and 1.24 grams of toluene. Six coats of this solution were brushed onto one face of the etched titanium coupon, heating the coupon after each coat. After each coat, the coupon was heated at the rate of 50° C. per 5 minutes to the temperature indicated in the following table and maintained at that temperature for 10 minutes. The temperatures used for each coat were:

| Coat number: | Temperature, ° C |
|---|---|
| 1 | 400 |
| 2 | 400 |
| 3 | 400 |
| 4 | 400 |
| 5 | 400 |
| 6 | 600 |

This procedure resulted in a spinel coating composition on the surface of the coupon of from about 0.02 gram per square inch of surface to about 0.03 gram per square inch of surface, and a total coating thickness of about 400 micro-inches.

The electrode was inserted in a beaker chlorate cell and utilized as the anode thereof as described in Example I hereinabove. After an extended period of electrolysis, the voltage across the cell was 11.0 volts at a current density of 27 amperes per square foot.

The electrode was removed from the cell and inserted in a vacuum furnace. A vacuum of $10^{-5}$ millimeters of mercury was established, and the electrode was heated, under vacuum, to a temperature of 950° C., and maintained thereat, under a vacuum of $10^{-5}$ millimeters of mercury for 1 hour.

Thereafter the electrode was cooled to room temperature, removed from the vacuum furnace, and reinserted in the beaker chlorate cell. At a current density of 100 amperes per square foot, the voltage across the cell was 3.00 volts.

Although this invention has been described with particular reference to the regeneration of anodes used for electrolysis of aqueous alkali metal chloride solutions, it is not limited to such use. The method herein contemplated may be used with electrodes that have been used in electrochemical reactions wherever a corrosion-resistant anode or at least one having lonng life is desired. Thus, the electrolyte in the cell may be a salt of a metal which may be electrodeposited and this electrolyte electrolyzed between the spinel surface anode and a cathode to electrodeposit the metal on the cathode. Copper, nickel, iron, manganese, and the like may be so deposited in these salts. Metal oxide electrodes used for the electrolytic oxidation of organic compounds, e.g., propylene to propylene oxide or propylene glycol, may be regenerated using this method. Moreover, when metal structures such as ships' hulls are cathodically protected using these anodes, this method may be used to regenerate these electrodes. In each case, the cell comprises the spinel surface anode herein described, a cathode, and means to establish an external voltage or electromotive force between the anode and cathode whereby the anode is positively charged with reference to the cathode.

It is to be understood that although the invention has been described with specific reference to specific details of particular embodiments thereof, it is not to be so limited since changes and alterations therein may be made which are within the full intended scope of this invention as defined by the appended claims.

I claim:

1. A method for treating an electrode having a spinel surface which has been used as an anode in an electrolytic process comprising heating the electrode for at least one-half hour to a regenerating temperature above about 700° C. in an atmosphere substantially free of oxygen and other reactive gases without first recoating said electrode.

2. The method of claim 1 wherein the electrode is heated under an inert gas.

3. The method of claim 1 wherein the electrode is heated under a vacuum of less than $10^{-4}$ millimeters of mercury.

4. The method of claim 1 wherein the electrode is heated for a period of one-half hour to two hours.

5. The method of claim 1 wherein the electrode is heated to between 700° C. and the deterioration temperature of the anode.

6. The process of electrolyzing a brine with an anode having a spinel surface comprising the steps of:
   electrolyzing a brine until the anode loses electrolytic activity;
   halting electrolysis and removing the anode from contact with the brine;
   heating the anode to a regenerating temperature between about 700° C. and the deterioration temperature of the anode for at least one-half hour in an atmosphere substantially free of oxygen and other reactive gases without first recoating said electrode; and
   reinserting the anode in the brine and resuming electrolysis.

7. The process of claim 6 wherein the anode is heated under an inert gas.

8. The process of claim 6 wherein the anode is heated under a vacuum of less than $10^{-4}$ millimeters of mercury.

9. The method of claim 6 wherein the anode is heated for a period of one-half hour to two hours.

10. A method of treating an electrode having a spinel surface which has been used as an anode in the electrolysis of an aqueous media which method comprises:
    heating the electrode for at least one-half hour in an atmosphere essentially free of oxygen and other reactive gases to at least 700° C. and below the temperature at which the electro conductivity of the surface is destroyed without first recoating said electrode.

11. The method of claim 10 wherein the electrode is heated for a period of from one-half hour to two hours.

12. The method of claim 10 wherein the electrode is heated under an inert gas.

13. The method of claim 10 wherein the electrode is heated under a vacuum of less than $10^{-4}$ millimeters of mercury.

14. A method of treating an electrode having a spinel surface on a valve metal substrate which has been used as an anode in the electrolysis of an aqueous media which method comprises:
    heating the electrode for at least one-half hour in an atmosphere essentially free of oxygen and other reactive gases to at least 700° C. and below the temperature at which the electroconductivity of the surface is destroyed without first recoating said electrode.

15. The method of claim 14 wherein the electrode is heated for a period of from one-half hour to two hours.

16. The method of claim 14 wherein the electrode is heated under a vacuum of less than $10^{-4}$ millimeters of mercury.

17. A method for treating an electrode having a bimetal spinel surface which has been used as an anode in an electrolytic process comprising heating the electrode for at least one-half hour to a regenerating temperature above about 700° C. in an atmosphere substantially free of oxygen and other reactive gases.

18. The method of claim 17 wherein the electrode is heated under an inert gas.

19. The method of claim 17 wherein the electrode is heated under a vacuum of less than $10^{-4}$ millimeters of mercury.

20. The method of claim 17 wherein the electrode is heated for a period of one-half hour to two hours.

21. The method of claim 17 wherein the electrode is heated to between 700° C. and the deterioration temperature of the anode.

22. The process of electrolyzing a brine with an anode having a bimetal spinel surface comprising the steps of:
    electrolyzing a brine until the anode loses electrolytic activity;
    halting electrolysis and removing the anode from contact with the brine;
    heating the anode for at least one-half hour to a regenerating temperature between about 700° C. and the deterioration temperature of the anode in an atmosphere substantially free of oxygen and other reactive gases; and
    reinserting the anode in the brine and resuming electrolysis.

23. The process of claim 22 wherein the anode is heated under an inert gas.

24. The process of claim 22 wherein the anode is heated under a vacuum of less than $10^{-4}$ millimeters of mercury.

25. The method of claim 22 wherein the anode is heated for a period of one-half hour to two hours.

26. A method of treating an electrode having a bimetal spinel surface which has been used as an anode in the electrolysis of an aqueous media which method comprises:
    heating the electrode for at least one-half hour in an atmosphere essentially free of oxygen and other reactive gases to at least 700° C. and below the temperature at which the electroconductivity of the surface is destroyed.

27. The method of claim 26 wherein the electrode is heated for a period of from one-half hour to two hours.

28. The method of claim 26 wherein the electrode is heated under an inert gas.

29. The method of claim 26 wherein the electrode is heated under a vacuum of less than $10^{-4}$ millimeters of mercury.

30. A method of treating an electrode having a bimetal spinel surface on a valve metal substrate which has been used as an anode in the electrolysis of an aqueous media which method comprises:
    heating the electrode for at least one-half hour in an atmosphere essentially free of oxygen and other reactive gases to at least 700° C. and below the temperature at which the electro-conductivity of the surface is destroyed.

31. The method of claim 30 wherein the electrode is heated for a period of from one-half hour to two hours.

32. The method of claim 30 wherein the electrode is heated under a vacuum of less than $10^{-4}$ millimeters of mercury.

References Cited

UNITED STATES PATENTS 3,103,484  9/1963  Messner __________ 204—290 F

FOREIGN PATENTS 1,174,451  12/1969  Great Britain ______ 204—290 F
1,164,434  9/1969  Great Britain ______ 204—290 F

OTHER REFERENCES

An Introduction to Crystal Chemistry, R. C. Evans, Cambridge Press, 1964, pp. 171–75.

JOHN H. MACK, Primary Examiner

R. J. FAY, Assistant Examiner

U.S. Cl. X.R.

204—290 F